April 15, 1958  M. S. SPARKS, JR., ET AL  2,831,118
ULTRA-VIOLET ANALYZER
Filed May 6, 1955  4 Sheets-Sheet 1

INVENTORS
M. S. SPARKS
R. L. KINDRED
BY
Hudson & Young
ATTORNEYS

April 15, 1958   M. S. SPARKS, JR., ET AL   2,831,118
ULTRA-VIOLET ANALYZER
Filed May 6, 1955   4 Sheets-Sheet 2

INVENTORS
M. S. SPARKS
R. L. KINDRED
BY
Hudson & Young
ATTORNEYS

INVENTORS
M. S. SPARKS
R. L. KINDRED
BY Hudson & Young
ATTORNEYS

April 15, 1958   M. S. SPARKS, JR., ET AL   2,831,118
ULTRA-VIOLET ANALYZER
Filed May 6, 1955   4 Sheets-Sheet 4

INVENTORS
M. S. SPARKS
R. L. KINDRED
BY
Hudson & Young
ATTORNEYS

United States Patent Office 2,831,118
Patented Apr. 15, 1958

2,831,118

ULTRA-VIOLET ANALYZER

Marshall S. Sparks, Jr., and Raymond L. Kindred, Bartlesville, Okla., assignors to Phillips Petroleum Company, a corporation of Delaware Application May 6, 1955, Serial No. 506,604

6 Claims. (Cl. 250—43.5)

This invention relates to analyzers utilizing radiation. In another aspect, it relates to a standardization system for periodically calibrating such analyzers.

Heretofore, many types of analyzers have been devised, wherein a beam of radiation is passed through a sample of material to be analyzed, the intensity of the radiation beam, after passing through the sample material, being representative of the concentration of a selected component or group of components in the sample material. In such circuits, there is an optical system capable of passing the radiation beam through the sample material, and an electric circuit for indicating or recording the beam intensity after it has passed through the sample material. In such instruments, aging of the circuit components and optical components, variations in radiation intensity due, for example, to variations in applied voltage, and numerous other factors oftentimes contribute to cause "drift" of the instrument reading. That is, the output indicated by the instrument is affected by aging of components and variations in supply voltage in addition to the variations caused by changes in concentration of the sample material.

This undesirable condition can be remedied by providing automatic standardization of the instrument, wherein adjustments are periodically made to the circuit components to compensate and counterbalance the effects produced by aging of components, variations in supply voltage, and other factors causing drift. A suitable standardization system of this type is disclosed in Hutchins Patent 2,579,825.

In accordance with this invention, a standardizing circuit of improved character is provided wherein the test material and a standard material are alternately interposed in a radiation beam, and an electrical voltage is produced which is representative of the beam intensity after it has passed through the material. This electrical voltage is passed through an impedance network including a potentiometer which is moved during the indicating period, i. e., the period when sample fluid passes through the sample cell, so as to balance the network, the position of the contactor of this potentiometer thereby being directly indicative of the composition of the sample material. During the standardization period, i. e., the period when standard material is flowing through the standard cell, a variable resistance in the network is varied to compensate for drift caused by the factors previously noted. It is an important feature of the invention that this variable resistor changes the current flow through the network potentiometer so that a "tapered" correction is produced which has been found very advantageous where the composition or radiation absorption of the standardizing material is quite dissimilar from that of the component for which analysis is made. Also, such tapered correction of the impedance network automatically adjusts the "span" of the output with respect to the recorder chart.

It will be understood that the relationship of concentration to displacement of the pen on the recorder chart or needle on the indicator is not a straight line relationship but, rather, a non-linear function. It is a feature of this invention that the "tapered" standardizing correction made by the present circuit is not linear but corresponds to this non-linear function. Thus, the standardization correction is quite accurate over the entire span of the recorder chart, as compared with previous systems where the correction was accurate at and close to the point of standardization, but slightly less accurate at other portions of the range of the instrument.

It is an object of the invention to provide an improved standardizing system for an analyzer utilizing radiation.

It is a further object to provide a novel standardizing circuit wherein the standardization network incorporates a series resistor which varies the current flow through the network during the indicating cycles.

It is a further object to provide an instrument which is reliable in operation, low in cost, accurate and utilizes a minimum number of optical and electrical components.

Various other objects, advantages and features of the invention will become apparent from the following detailed description taken in conjunction with the accompanying drawings, in which.

Figure 2:
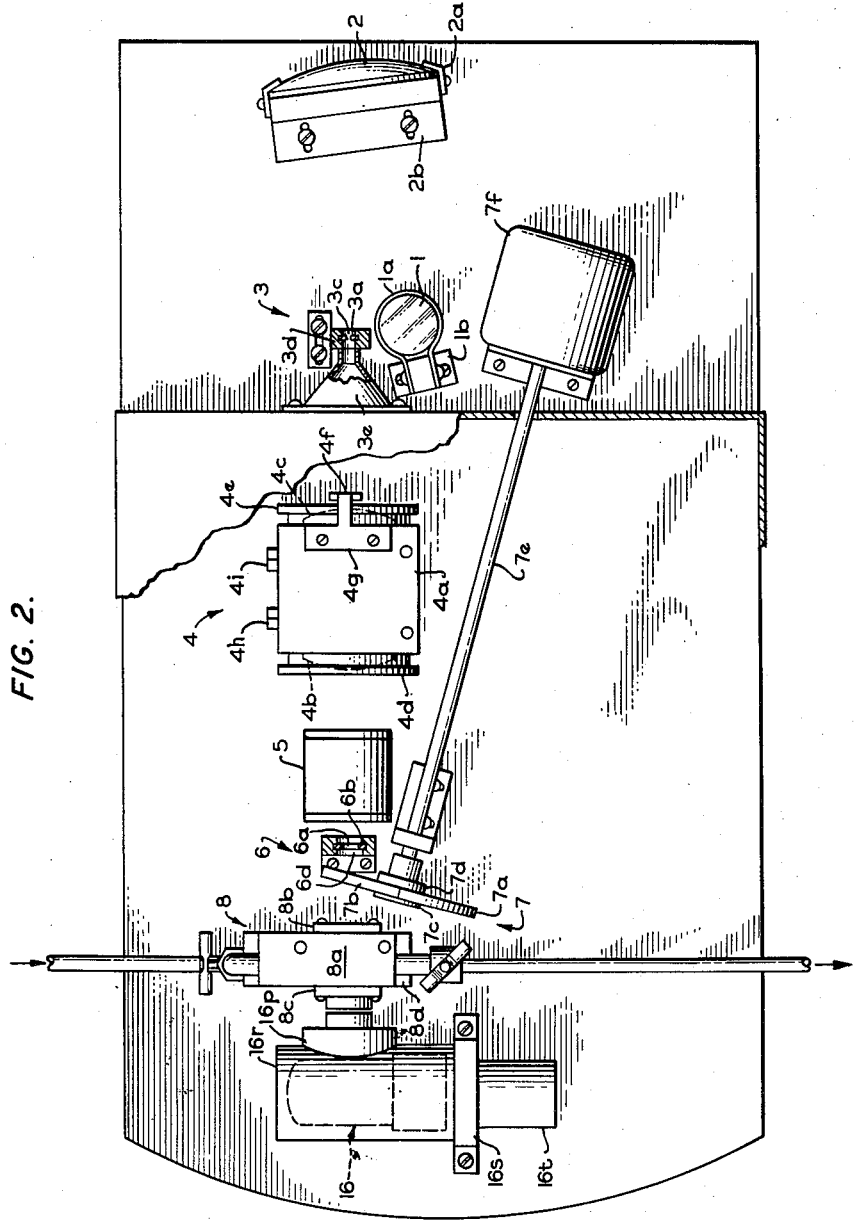
Figure 2 is an elevational view of the optical system of an analyzer constructed in accordance with the invention.

Referring now to Figure 2, the instrument includes a radiation source 1, which can be a hydrogen lamp in the case of an ultraviolet analyzer, this lamp being mounted on a bracket 1a secured to a mounting fixture 1b.

Radiation from the source 1 is reflected by a mirror 2 secured by clips 2a to a bracket 2b, and the reflected radiation beam passes through a small circular opening or aperture 3c formed in a disk 3a, which is mounted on a support 3d. See Figure 6. Mounted adjacent support 3d is a frusto-conical radiation shield 3e.

After passing through the aperture assembly 3, the radiation beam enters a focal isolation unit 4 including a lens holder 4a, and a pair of longitudinally-spaced lenses 4b, 4c secured to the holder by lens caps 4d and 4e, respectively, a disk-shaped blocking member 4f being secured by a bracket 4g to the holder 4a to intercept or block out the central portion of the radiation beam and provide an annular beam impinging upon the lens 4c. As will become apparent hereafter, filter materials, standard fluid or sample fluid can in some cases be admitted to the interior of the lens holder and, for this purpose, there is provided an inlet fitting 4h and an outlet fitting 4i.

After leaving the focal isolation unit 4, the beam passes through a cell 5 containing a radiation-absorbing or filter material and, thence, through a small circular aperture 6a formed in a disk 6b which is secured to a support 6d, this assembly constituting an exit aperture assembly 6.

After leaving the assembly 6, the beam passes through a chopper 7. This assembly includes a disk having a section 7a of material substantially transparent to the radiation under consideration and a section 7b composed of a filter material, this disk being secured by mounting members 7c, 7d to a shaft 7e which is driven by a motor 7f.

The chopped radiation beam leaving the chopper 7 passes through a cell 8a of an assembly 8. This cell is, in the example shown, adapted to be traversed alternately by sample fluid during an indicating cycle and by standard fluid during a standardization cycle wherein electrical circuit components are adjusted to compensate for any effects caused by drift, resulting, for example, from aging of circuit or optical components, variations in radiation intensity and similar factors. The cell is provided with radiation transparent windows, not shown, held in place by caps 8b and 8c, the cell itself being mounted on a bracket 8d.

After traversing the material in the cell 8a, the radiation beam passes through a shield 16p and impinges upon a radiation-sensitive device 16. Where ultraviolet radiation is utilized, the device 16 can be a photomultiplier tube which is provided with a shield 16r, the tube and shield being secured to a support 16s which has attached at its lower end a cap 16t covering the resistances associated with the tube.

The operation of the described structure will be described in connection with the determination of the quantity of butadiene in a sample stream utilizing a focal isolation ultraviolet analyzer. In such case, the source 1 is a hydrogen lamp, the lenses 4b, 4c, the transparent windows of the cells 5 and 8a are all formed from quartz, the section 7b of the chopper disk is formed from Vycor, a glass manufactured by Corning Glass Works, Corning, New York, containing approximately 96 percent silicon dioxide and having ultraviolet transmission characteristics approximating those of butadiene, and the section 7a of the disk is formed from quartz. The cell 5 is filled with chlorine gas.

Assuming that the cell 8a contains a butadiene-containing sample to be analyzed, it will be noted that ultraviolet radiation passes from the source and mirror 2 through the slit assembly 3 to the focal isolation device 4. In this device, the quartz lenses exhibit a rapid change in refractive index with change in wavelength in the general region of 1800 to 3000 angstrom units. This change in refractive index with change in wavelength results in chromatic aberration of the lens such that radiation of different wavelengths is focused at different points along the longitudinal axis of the optical system proceeding downwardly from the assembly 4.

Figure 5:
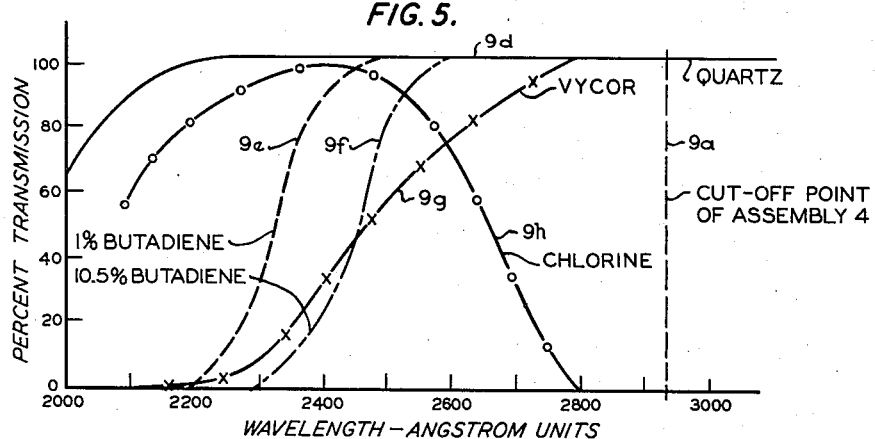
Figure 5 is a graph illustrating the operation of the filter system.
Figure 6:
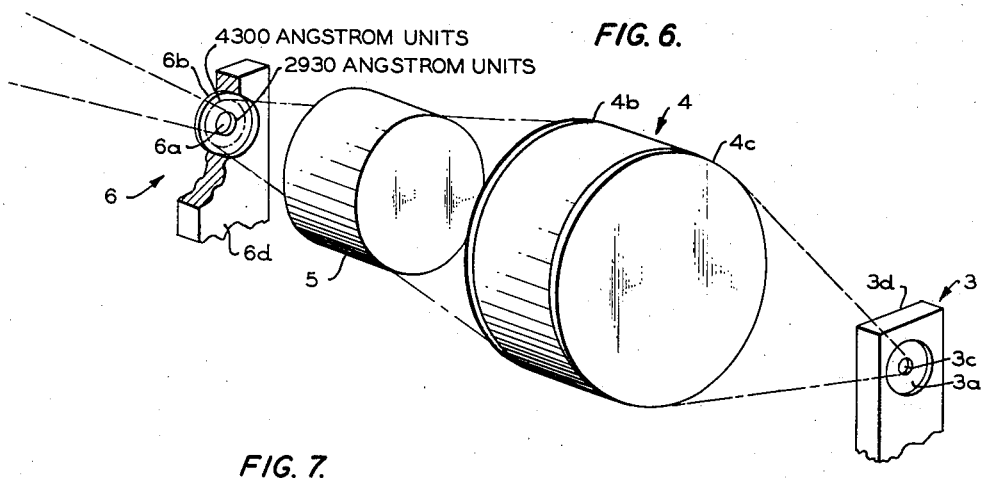
Figure 6 is a perspective view illustrating a feature of the optical system.

By properly adjusting the size of the aperture 6a and its axial position, certain wavelengths of ultraviolet radiation can be cut out. In the example shown, the slit width and axial position are so adjusted that wave-lengths longer or higher than about 2900 to 3000 angstrom units are cut off, as indicated by the dashed line 9a, Figure 5. This is also illustrated in Figure 6 wherein it will be noted that wavelengths higher than 2900 to 3000 angstrom units, specifically 2930 angstrom units, are cut off because they cannot pass through the aperture 6a but, rather, are intercepted by the disk 6b. However, wavelengths shorter than 2900 to 3000 angstrom units pass readily through the aperture 6a. In Figure 5, the absorption characteristics of the quartz in the system are indicated by the solid line 9d.

After wavelengths of greater than 2900 to 3000 angstrom units are cut off by the assembly 4, 6, the radiation beam passes through the chopper disk and the cell 8a to the photomultiplier tube 16.

Figure 1:
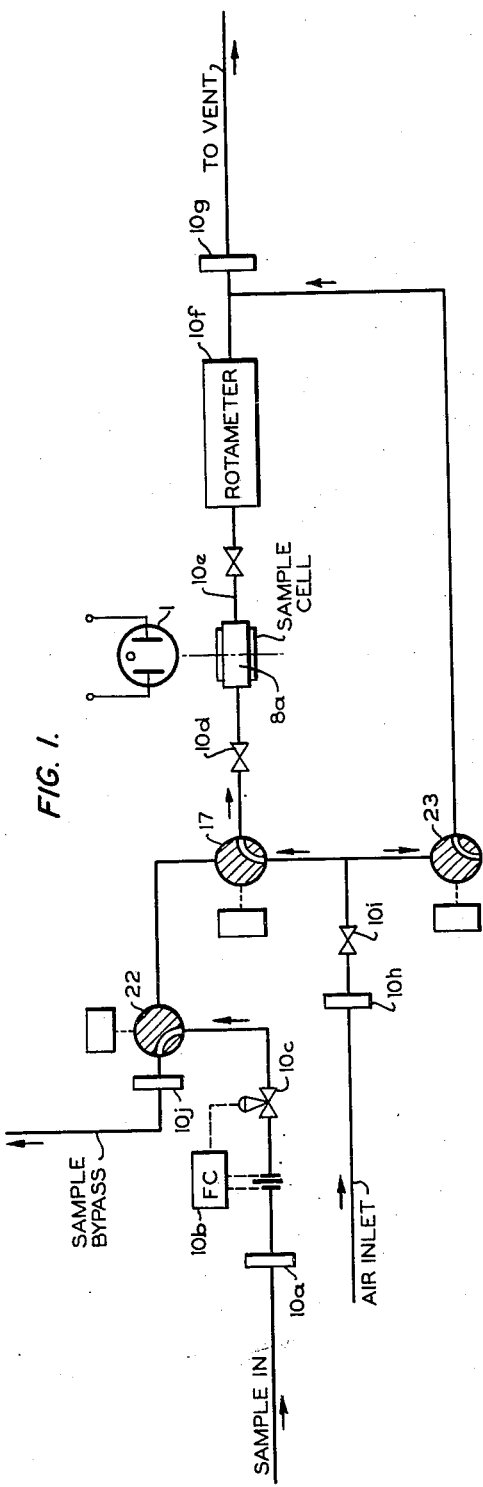
Figure 1 is a schematic view of the fluid-handling system of an analyzer constructed in accordance with the invention.

The absorption characteristics of a sample containing 1 percent by weight of butadiene are indicated by the dashed line 9e, Figure 5, while the absorption characteristics of a sample containing 10.5 percent by weight of butadiene are indicated by the dashed dot line 9f, Figure 5. The absorption characteristics of the Vycor section 7b of the chopper disk are indicated by the line 9g. From this figure, it will be evident that changes in butadiene content within the range of 1 to 10.5 percent will not affect the beam intensity while the Vycor filter 7b, Figure 1, is in the path thereof for this filter strongly absorbs the radiation in the same region as does the butadiene. However, when the quartz section 7a of the chopper disk is in the path of the beam, the beam intensity is affected by the butadiene concentration. Thus, by comparison of the intensities of these two portions of the beam, an output is produced which is directly representative of the butadiene concentration in the sample.

From the foregoing discussion, it will be noted that the amount of radiation passing through the instrument is a function of the cut off wavelength of radiation produced by the assembly 4, 6 which, in turn, is critically determined by the size and position of the aperture 6a. In accordance with the invention, the provision of chlorine gas in the cell 5 eliminates this critical dependence of the cut off point upon the width and position of the slit assembly. The absorption characteristics resulting from the use of the chlorine cell are indicated by the line 9h on Figure 5, and it will be noted that the characteristics are such that all radiation longer than about 2800 angstrom units is cut off while substantial transparency is maintained within the wavelength band of interest, i. e., from 2150 to 2600 angstrom units. Accordingly, the cut off wavelength of the focal isolation assembly 4 can be varied without affecting the sensitivity or response of the instrument which, in turn, prevents the necessity for critical adjustment of the size and axial position of the assembly 6. The assembly 4, 6 thus functions to remove all wavelengths above the cut off point (some of which would not be removed by the chlorine gas alone) while the gas eliminates critical dependence of the cut off wavelength upon the aperture size and position.

It will be understood that the described filter system can be advantageously applied to various types of analyzers by properly selecting the characteristics of the filter element, the essential characteristic of the filter material in cell 5 being that it substantially removes the band of wavelengths at and near the cut off point of the assembly 4, 6 which act essentially as a filter with a critical sharp cut off point.

Moreover, other types of radiation can be used in the instrument as, for example, visible light or infrared radiation. Where infrared radiation is utilized, the source can be an incandescent filament and the detectors can be bolometers. Further, the position of the chlorine-containing cell or to the similar filtering medium is not critical. For example, the cell 5 can be eliminated and the chlorine gas or other filter medium introduced into the interior of the unit 4a.

The manner in which the fluid flow into the cell 8a is controlled is illustrated by Figures 1 and 2.

In Figure 1, it will be noted that the sample passes through a flame arrester 10a, a flow controller 10b, a valve 10c, a three-way solenoid valve 22, a three-way solenoid valve 17 and a valve 10d to the sample cell. Material leaves the sample cell through a valved line 10e, a rotameter 10f and a flame arrester 10g. Thus, with valves 22 and 17 in the proper position, the sample is admitted to the cell, its rate of flow is measured and controlled by the instruments described. This arrangement is provided automatically during the indicating cycles where the test sample is being analyzed in the manner hereafter described.

It will be further noted that air can be admitted to the sample cell through a line including a flame arrester 10h and a valve 10i, the air thence proceeding either to the cell 8a through valve 17 or through a solenoid valve 23 to the outlet pipe and flame arrester 10g. Further, a sample bypass line provided with a flame arrester 10j is connected to the solenoid valve 22.

During the standardizing cycles, air is passed through the cell 8a as indicated, and valve 22 is operated so as to pass the incoming sample through the sample bypass line and flame arrester 10j. While air is passing through the cell, the instrument automatically standardizes itself, i. e., varies a parameter in the electrical bridge circuit to be hereinafter described so as to compensate for drift resulting from the factors hereinbefore mentioned. During the indicating cycles, the air passes through valve 23 to the outlet pipe and flame arrester 10g. Thus, the described system causes sample fluid to pass through the cell 8a during the indicating cycle, and air to pass through the cell 8a during the standardizing cycle, the sample and standardizing fluids being bypassed during the intervals when they are not passing through the cell.

In some cases, one of the valves is omitted and the system includes one two-way valve regulating the flow of sample either to the cell or the by-pass line, and a second two-way valve regulating the flow of air to the cell or bypass line.

Figure 3:
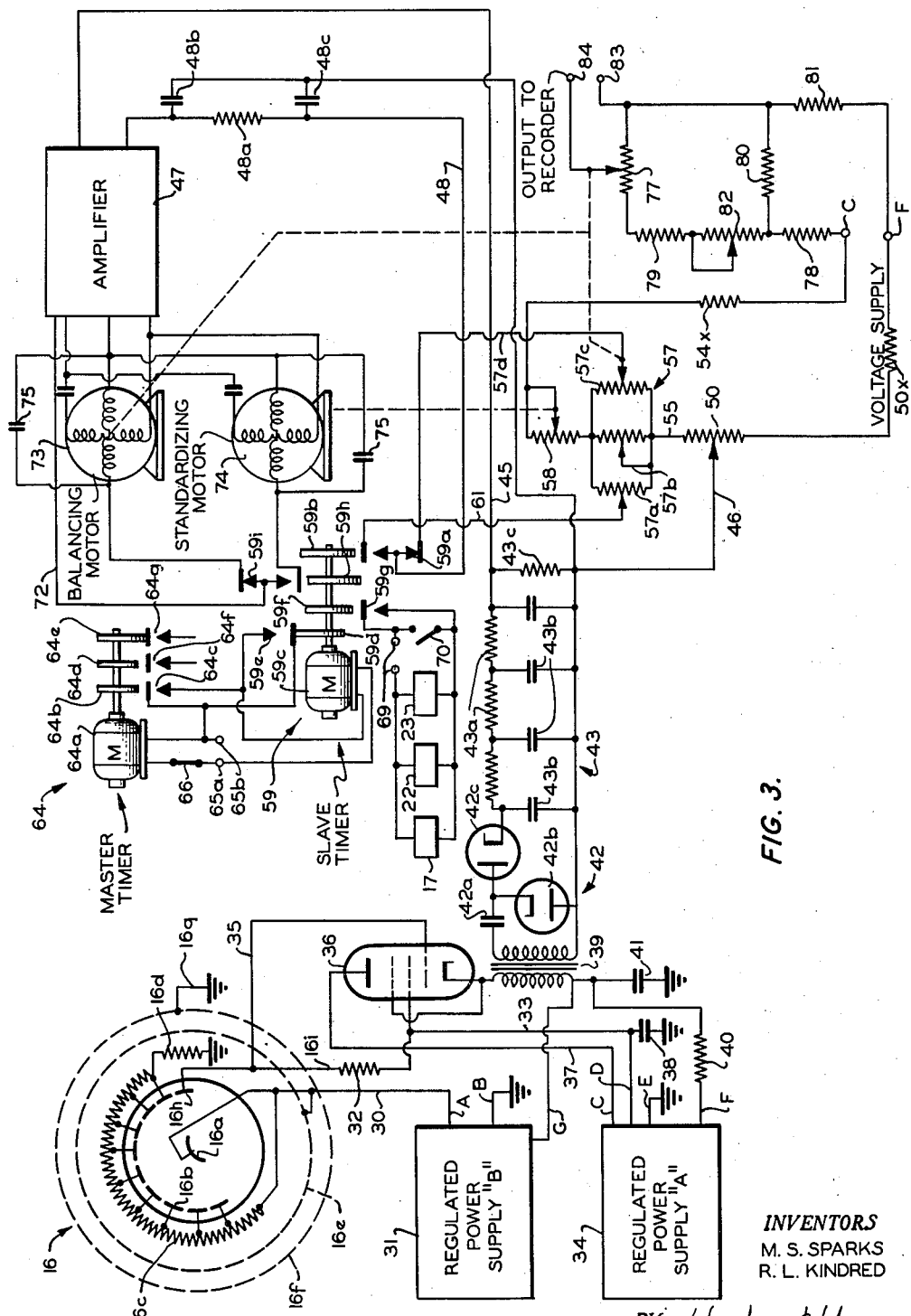
Figure 3 is a schematic circuit diagram of the analyzer.

Referring now to Figure 3, it will be seen that the photomultiplier tube 16 has a cathode 16a which is connected by a lead 30 to a low potential terminal A of a regulated power supply 31. The tube 16 also has a series of anodes 16b which are inter-connected by a network 16c of series resistances, one terminal of the network being connected to lead 30, and the other terminal of the network being grounded through a fixed resistance 16d. The tube 16 is further provided with an inner shield 16e which is connected to lead 30 and an outer shield 16f which is grounded at 16g. Also forming a part of the tube 16 is an anode 16h from which the electrical output is withdrawn. The anode 16h is connected by a lead 16i, a fixed resistance 32 and a lead 33 to a positive terminal D of a regulated power supply 34 which has a grounded low potential terminal E. It will be noted that power supply 31 has a grounded high potential terminal B so that the two power supplies are, in effect, connected in series to provide the requisite power for operating the photomultiplier tube.

The anode 16h is further connected by lead 35 to the control grid of a cathode follower tube 36. The anode of this tube is connected to a high potential terminal C of power supply 34 by a lead 37, the suppressor grid is connected to the cathode of the tube, and the screen grid is connected by lead 33, which has a grounded bypass condenser 38, to the positive power supply terminal D. The cathode of the tube is connected through the primary winding of a transformer 39 to a power supply terminal G and through a resistor 40 to a low potential bias terminal F of the power supply 34, the lower end of the primary winding having a grounded bypass condenser 41 connected thereto. It will be understood that the alternating output voltage of the tube 16 is fed through the cathode follower 36 to the primary winding of the transformer 39.

The secondary winding of transformer 39 is connected to a peak detector circuit 42 consisting of a condenser 42a, a rectifier or diode 42b connected in parallel through condenser 42a with the secondary winding of transformer 39, and a series rectifier or diode 42c. The function of this circuit is to efficiently rectify the voltage appearing at the secondary winding of transformer 39, the rectified voltage being passed through a filter 43, consisting of series resistances 43a, parallel condensers 43b, and an output resistor 43c. Consequently, a rectified direct voltage appears between a lead 45 connected to the upper terminal of resistor 43c and a lead 46 connected to the lower terminal of resistor 43c, this rectified voltage having a magnitude proportional to the peak-to-peak amplitude of the alternating output voltage produced by tube 16.

The lead 45 is connected to one input terminal of an amplifier 47, the other input terminal of which is connected to a lead 48 through a filter consisting of a series resistor 48a and parallel condensers 48b and 48c.

In accordance with the invention, a bucking voltage appears between the leads 46 and 48 which is fed to the amplifier input in series with the rectified voltage appearing across leads 45 and 46. To this end, lead 46 is connected to the contactor of a potentiometer 50, which has one terminal connected through a fixed resistance 50x to the power supply terminal F while the other fixed terminal of potentiometer 50 is connected through a lead 55, a potentiometer unit 57, a variable resistance 58 and a fixed resistance 54x to the power supply terminal C.

The unit 57 includes three potentiometers 57a, 57b and 57c which are connected in parallel. The contactor of potentiometer 57c is connected by a lead 57d to one fixed contact of a set 59a actuated by a cam 59b of a slave timer 59. The contactor of potentiometer 57a is connected by a lead 61 to the other fixed contact of set 59a. A movable contact cooperates with these fixed contacts and is connected to lead 48 to the end that this amplifier input lead is connected either to the contactor of potentiometer 57a or to the contactor of potentiometer 57c depending upon the position of cam 59b.

Due to the described connection of the resistor network, a standardizing voltage appears between leads 46, 61 while a bucking voltage appears across the leads 46 and 57d, the magnitude of this voltage depending upon the relative positions of the potentiometer contactors and that of the variable resistance 58. One or the other of these voltages, depending upon the position of cam 59b, is applied to the input of the amplifier in series with the rectified output voltage appearing across leads 45, 46. Potentiometer 57b permits a quick convenient adjustment of the direct voltage impressed across the potentiometer units.

The operation of the timer 59 which drives cam 59b is controlled by a master timer 64. This unit has a motor 64a which is connected to one of a set 65a, 65b of power supply terminals through a switch 66 and to the other terminal 65b of this set through a suitable lead. The motor 64a has a shaft which carries a cam 64b controlling a set of contacts 64c. The timer 59 has a motor 59c and a cam 59d which operates a contact set 59e. The motor 59c is connected to the power source 65a, 65b, through the contacts 59e and 64c which are connected in parallel.

During each revolution of cam 64b, there is a momentary closure of contacts 64c which initiates operation of motor 59c and thereby causes cam 59d to close contacts 59e, which remain closed for a full revolution of the shaft of timer 59. Thus, for each revolution of the shaft of timer 64, there is a complete revolution of the shaft of timer 59, the timing being so adjusted that the described actuation of timer 59 occupies only a small part of the cycle of timer 64.

In particular, timer 64 can make one revolution per hour and timer 59 can have a cycle of five minutes. The period during which the timer 59 is operable is referred to hereinafter as the standardization cycle while the remainder of the period of operation of timer 64 is referred to as the indicating cycle. During the indicating cycle, one process stream can be analyzed or, alternatively, timer 64 can operate to successively admit samples of different materials to be analyzed to the path of the radiation beam so that a multiplicity of streams can be analyzed with a single instrument. To this end, I have shown cams 64d and 64e associated with contact sets 64f and 64g, respectively, which are capable of actuating solenoid valves to admit successively a plurality of samples streams to the instrument during the indicating cycle.

However, as shown, only one process stream is analyzed during the indicating cycle and the controls for operating the solenoids of the sample and standard fluid valves are incorporated in timer 59. Specifically, timer 59 has a cam 59f which actuates a set of contacts 59g, these contacts being connected in series with a current source 69 and the solenoids of valves 17, 22, and 23, all of which are connected in parallel. The cam 59f is so shaped as to actuate the solenoids during the standardization cycle, and de-energize them during the indicating cycle. This causes air to be bypassed, and sample material to pass through the cell 8a during the indicating cycle, and causes air to pass through the cell 8a, and the sample fluid to be bypassed during the standardization cycle, in the manner previously explained in detailed. A switch 70 is connected in parallel with contacts 59g to permit valve actuation manually and thus provide flow of standard fluid whenever desired, independent of the operation of timer 59.

Timer 59 further operates cam 59b to cause the contactor of potentiometer 57c to be connected to lead 48 and the amplifier input during the indicating cycle and to cause the contactor of potentiometer 57a to be connected to lead 48 and the amplifier input during the standardization cycle, this being effected by the contact set 59a.

Timer 59 also includes a cam 59h which actuates a set of contacts 59i. These contacts selectively connect an amplifier output lead 72 to a balancing motor 73 or a standardization motor 74, the respective coils of the motor, with the exception of those connected to contact set 59i, being connected to the amplifier output terminals in well understood fashion. Each of the motors 73, 74 has a condenser 75 connected in parallel with one winding thereof. During the indicating cycle, contacts 59i connect balancing motor 73 to the amplifier output and it will be noted that this motor is mechanically connected to the contactor of potentiometer 57c and to the contactor of a potentiometer 77.

An adjustable direct potential is applied across the fixed terminals potentiometer 77 from power supply terminals C and F by a resistance network including fixed resistances 78, 79, 80 and 81 together with a variable resistance 82. One output terminal 83 of the instrument is connected to to junction between resistances 80, 81 and the other output terminal 84 is connected to the contactor of potentiometer 77. In this manner, an output voltage is produced which is indicative of the position of the contactors of potentiometers 57c and 77. It will be understood that this output is fed to any suitable recorder or indicating device, and the term indicating device in the appended claims is intended to cover both an indicating instrument and/or a recording instrument.

During the standardization cycle, contacts 59i connect the amplifier output to standardizing motor 74, which is mechanically connected to the contactor of variable resistor 58.

In the over-all operation of the system, during the indicating cycle, timer 59 is de-energized so that, referring to Figure 1, air is bypassed and sample material passes through the cell 8a. A rectified voltage representative of the concentration of the material under analysis appears between leads 45, 46, and this voltage is fed to the input of amplifier 47 in series with the bucking voltage between lead 46, on the one hand, and leads 48, 57d and the contactor of potentiometer 57c, on the other hand, it being recalled that contacts 59a connect lead 48 to lead 57d during the indicating cycle.

Also, balancing motor 73 receives the output of the amplifier, and this motor is mechanically connected, as stated, to the contactors of potentiometers 77 and 57c. The action of the motor 73 is to drive the input voltage of the amplifier to zero by moving the contactor of potentiometer 57c until the bucking voltage is equal to the output voltage appearing across leads 45 and 46 so that a null condition is obtained. As the composition of the sample changes, the output voltage similarly changes with the result that the contactor of potentiometer 57c is moved successively to different positions to maintain the null condition. It follows that the position of the contactor of potentiometer 57c, as well as that of the contactor of potentiometer 77, is representative of the amount of the component under analysis present in the sample stream, as is the voltage appearing across terminals 83 and 84.

At the end of the indicating cycle, timer 59 is actuated by timer 64 and passes through a complete cycle of operation. During this standardizing cycle, valves 17, 22, and 23 are actuated by the action of contact set 59g to cause air to pass through the cell 8a, and the sample stream to be bypassed through the line 10j.

Responsive to the action of cam 59b and contact set 59a, lead 48 is switched from the contactor of potentiometer 57c to the contactor of potentiometer 57a and, by the action of contacts 59i, the output of amplifier 47 is disconnected from the balancing motor 73 and applied to the standardizing motor 74. As a result, the output appearing across leads 45, 46 is applied to the amplifier in series with the voltage appearing between leads 46 and 61. If no drift has occurred since the next preceding standardization cycle, the standardization voltage appearing between leads 46, 61 is equal to and balances the output voltage at leads 45, 46. Hence, no movement of motor 74 and variable resistance 58 occurs. However, if drift has occurred, the output voltage will be unequal to the standardizing voltage, and motor 74 will move variable resistance 58 until a balanced condition again prevails. This compensates for the error which would otherwise be introduced into the system by drift. It will be noted that this adjustment of variable resistance 58 varies the bucking voltage which will be compared with the output voltage at leads 45, 46 during the next indicating cycle, and thus, in effect, changes the index position of the contactor of potentiometer 57c during this next indicating cycle.

At the end of the standardizing cycle, timer 59 stops while the rotation of timer 64 continues to initiate a new (indicating) cycle.

It will be apparent from the foregoing description that the standardization circuit has a number of important advantages. In particular, the current through the network producing the bucking voltage is changed during standardization as well as the magnitude of the bucking voltage itself. This means that a fixed voltage correction is applied at that part of the calibration curve of the instrument where the standardization takes place. However, at points removed from the standardization point on the calibration curve, due to the aforesaid change in current through the network, the correction voltage is either slightly greater or slightly less than the correction voltage applied at the calibration point. Thus, in effect, the correction voltage is "tapered." In practice, this has been found quite advantageous where the composition of the standardizing fluid is different from that of the material being analyzed to a substantial degree, e. g., where the material to be analyzed is butadiene and the standardization material is air. The tapering of the correction voltage in the manner aforesaid results in a better compensation for factors causing drift, and can advantageously be applied where only one cell is interposed in the path of the beam, air or other standardizing material, and butadiene or other material to be analyzed being fed alternately through this cell.

Figure 8:
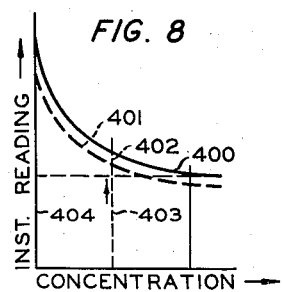
Figure 8 is a graph illustrating a feature of the invention.

Referring to Figure 8, we have shown the relationship between instrument reading and concentration, as represented by the line 400. Assuming that this relationship changes, due to drift, to that represented by the dotted line 401, potentiometer 58, Figure 3, is adjusted during the standardization cycle to produce an adjustment as indicated by the arrow 402. Due to the novel "tapered" correction feature, such adjustment restores the curve 401 almost identically to the position represented by curve 400. That is, the correction is effective over the entire range of the instrument. Thus, standardization can be effected with a fluid having a concentration of the component of interest represented by line 403 or even by air, represented by line 404, without affecting the accuracy of this standardization adjustment.

However, if the proportional feature were not present, the shape of the curve 401 would not be the same as the shape of the curve 400 so that, after standardization, the reading of the instrument would be slightly different for a fluid of a given concentration than the original reading. This makes it quite important or even necessary in instruments having a non-tapered standardization adjustment to utilize a standardization fluid having the same radiation absorption as the sample at the concentration of greatest interest, because at this point the standardization is precise, and only a small error is introduced at a concentration only slightly different from that of the standardization fluid. At concentrations further removed from that of the standardization fluid, the error is larger. With the circuit of the present invention, however, due to the "tapered" correction effected, the radiation absorption characteristics of the standard and sample materials can be quite dissimilar without affecting the accuracy of the standardization. In fact, by introducing a suitable voltage source in the standardization circuit, as in series with the contactor of the potentiometer 57a, the composition of the standardization fluid can be one which would otherwise cause the recorder to move off scale. The same result could be obtained by connecting the fixed terminals of potentiometer 57a at different selected points of the network composed of resistances 50, 57b and 57c, and 58.

Figure 4:
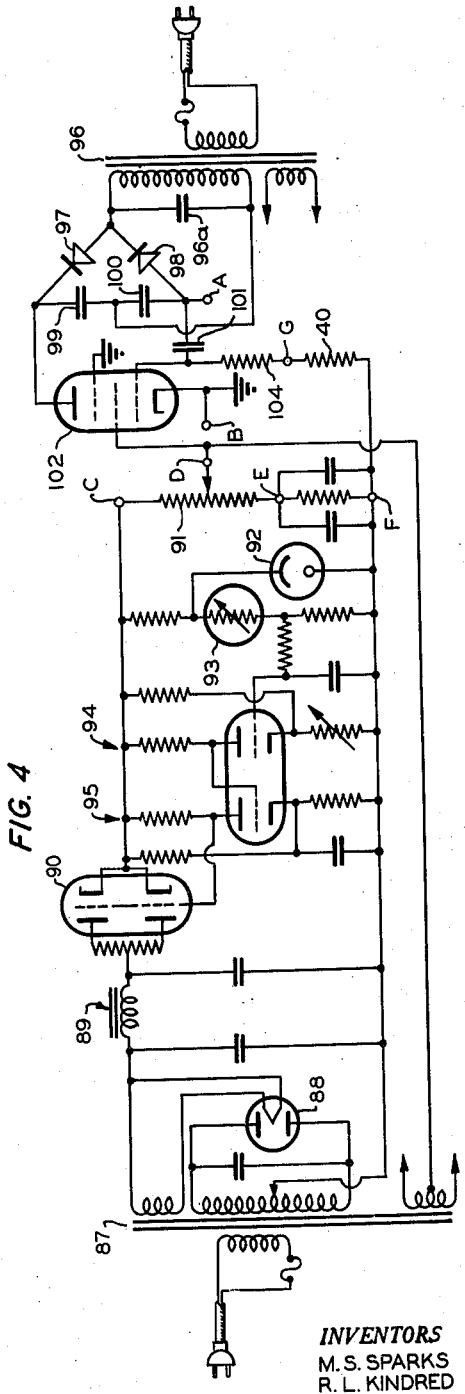
Figure 4 is a schematic circuit diagram of the power supply circuit.

In Figure 4, we have shown a suitable power supply circuit for use with the described instrument. This circuit includes a power transformer 87, dual diode rectifier 88, inductance-capacitance filter 89, and voltage regulator tube 90 which supplies voltage to the terminals C, D, E, and F of a bleeder resistance 91. Regulation of the power supply is obtained through a regulator tube 92 and a temperature compensation device 93, the output of which is fed through two amplifier stages 94 and 95 to the control grid of regulator tube 90, thus producing a constant voltage output across the power supply terminals. Cooperating with the described power supply unit is a second regulated supply which includes a transformer 96, condenser 96a, rectifiers 97 and 98, condensers 99, 100, 101, and a regulator tube 102, the cathode of which is grounded and connected to output terminal B, the other output terminal A being connected to the junction between rectifier 98 and condenser 100. Regulator tube 102 is controlled by a voltage impressed upon its control grid which is connected to condenser 101 and through a fixed resistance 104 and the resistor 40 to power supply terminal F. In this manner, a regulated current through tube 16 is obtained which is advantageous in reducing the amount of drift and noise due to the variations in power supply voltage, aging components, dirty windows, etc.

Figure 7:
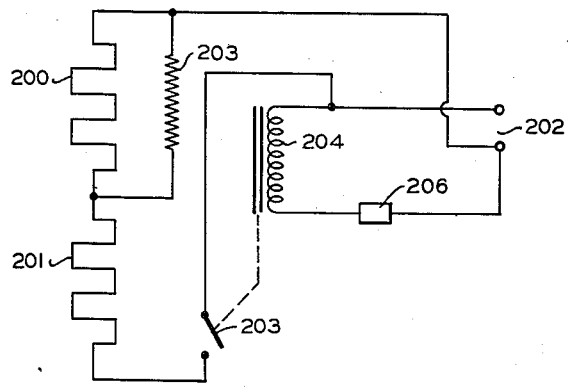
Figure 7 is a schematic circuit diagram of a temperature compensating circuit for maintaining the sample cell at a constant temperature.

Referring now to Figure 7, I have shown a circuit for maintaining the sample cell at an accurate predetermined temperature. This circuit includes a pair of heating elements 200, 201 which are connected in series with an alternating current source 202, and a set 203 of relay contacts, the heater unit 200 being shunted by a fixed resistance 203. The relay has a winding 204 which is connected in series with the current source 202 and a thermostatic element 206. The element 206 and both heating elements are mounted in thermal contact with the material of the sample cell, and it will be evident that when the thermostatic element senses a cell temperature of lower than a predetermined value the relay winding 204 is energized thus supplying current to the heating elements and maintaining the sample cell at an accurate predetermined temperature.

While the invention has been described in connection with present, preferred embodiments thereof, it is to be understood that this description is illustrative only and is not intended to limit the invention.

We claim:

1. In an analyzer, in combination, a radiation detector, means connected to said detector to produce an electrical voltage, an amplifier, a variable resistance, a first potentiometer and a second potentiometer all connected in series, means for applying a direct voltage across the series connected units, a third potentiometer connected in parallel with said first potentiometer, a standardizing motor connected to the contactor of said variable resistance, a balancing motor connected to the contactor of said first potentiometer, a timer actuatable to alternately (a) apply said electrical voltage to the input of said amplifier in series with the voltage appearing between the contactor of said first and second potentiometers, and apply the output of said amplifier to said balancing motor and (b) apply said electrical voltage to the input of said amplifier in series with the voltage appearing between the contactors of said second and third potentiometers, and apply the output of said amplifier to said standardizing motor, and indicating means responsive to the position of the contactor of said first potentiometer.

2. In an analyzer, in combination, a radiation detector, means connected to said detector to produce an electrical voltage, an amplifier, a network including a plurality of impedance units connected in series, one of said units including first and second potentiometers connected in parallel, means for applying a direct voltage across said series connected units, a balancing motor connected to the contactor of said first potentiometer, a standardizing motor connected to an impedance other than said one impedance unit, said impedance being a variable resistance arranged to vary the current flow through said network, a timer actuatable to alternately (a) apply said electrical voltage to the input of said amplifier in series with the voltage appearing between the contactor of said first potentiometer and a connection to an impedance unit other than said one impedance unit, and to apply the output of said amplifier to said balancing motor and (b) apply said electrical voltage to the input of said amplifier in series with the voltage appearing between the contactor of said second potentiometer and said connection, and apply the output of said amplifier to said standardizing motor, and indicating means responsive to the position of the contactor of said first potentiometer.

3. In an analyzer, in combination, a radiation source, a radiation detector unit, means for cyclically passing radiation from said source to said unit (a) through a sample fluid during an indicating cycle and (b) through a standard fluid during a standardization cycle, an impedance network, means for feeding the output of said detector to said network, an amplifier having its input connected to said network, servomotor means, a potentiometer included in said network and arranged to balance same, a variable resistance in said network arranged to vary the current through said potentiometer, means for feeding the output of said amplifier to said servomotor means and connecting same to said potentiometer during the indicating cycle, and means for feeding the output of said amplifier to said servomotor means and connecting same to said variable resistance during the standardization cycle.

4. In a radiation analyzer, in combination, a radiation source, a radiation detector arranged to receive a beam of radiation from said source, a cell in the path of said beam, means for feeding a sample fluid to said cell during each one of a plurality of indicating cycles, means for feeding a standardizing fluid to said cell during each of a plurality of recurrent standardization cycles, an impedance network, means for feeding the output of said detector to said network, an amplifier having its input connected to said network, a balancing motor, a standardization motor, a potentiometer included in said network and arranged to balance same, a variable resistance in said network arranged to vary the current through said potentiometer, means for feeding the output of said amplifier to said balancing motor and connecting said balancing motor to said potentiometer during the indicating cycle, and means for feeding the output of said amplifier to said standardizing motor and connecting said motor to said variable resistance during the standardization cycle.

5. In an ultraviolet analyzer, in combination, a source of ultraviolet radiation, a photomultiplier tube arranged to receive a beam of ultraviolet radiation from said source, a cell in the path of said beam, means for feeding a sample containing butadiene through said said cell during each of a plurality of repetitive indicating cycles, means for feeding air through said cell during each of a plurality of repetitive standardizing cycles, an impedance network, means for feeding the output of said detector to said network, an amplifier having its input connected to said network, a balancing motor, a standardization motor, a potentiometer included in said network and arranged to balance same, a variable resistance in said network arranged to vary the current through said potentiometer, means for feeding the output of said amplifier to said balancing motor and connecting said balancing motor to said potentiometer during the indicating cycle, and means for feeding the output of said amplifier to said standardizing motor and connecting said motor to said variable resistance during the standardization cycle.

6. In an ultraviolet analyzer, in combination, a source of ultraviolet radiation, a photomultiplier tube arranged to receive a beam of ultraviolet radiation from said source, a cell in the path of said beam, means for feeding a sample containing butadiene through said cell during each of a plurality of repetitive indicating cycles, means for feeding air through said cell during each of a plurality of repetitive standardizing cycles, an impedance network including a variable resistance, a potentiometer unit, and a first potentiometer all connected in series, means for applying a potential across the series-connected units, said potentiometer unit including a second potentiometer, a third potentiometer and a fourth potentiometer, said third potentiometer having its contactor connected to one fixed terminal thereof, an amplifier, a balancing motor having its shaft connected to the contactor of said fourth potentiometer, a standardizing motor having its shaft connected to the contactor of said variable resistance, and timing mechanism arranged to pass through successive standardizing and indicating cycles, said timing mechanism, during each indicating cycle, (a) applying the output of said photomultiplier tube across the input terminal of the amplifier and the contactor of said first potentiometer (b) connecting the other input terminal of said amplifier to said fourth potentiometer and (c) connecting the output of said amplifier to said balancing motor and, during each standardizing cycle (a) applying the output of said photomultiplier tube across the contactor of said first potentiometer and said one input terminal of the amplifier (b) connecting said other input terminal of the amplifier to the contactor of said first potentiometer and (c) connecting the output of said amplifier to said standardizing motor.

References Cited in the file of this patent
UNITED STATES PATENTS

| | | |
|---|---|---|
| 2,579,825 | Hutchins | Dec. 25, 1951 |
| 2,621,298 | Wild et al. | Dec. 9, 1952 |
| 2,694,335 | Albright et al. | Nov. 16, 1954 |